United States Patent
Ellison et al.

(10) Patent No.: US 8,006,295 B2
(45) Date of Patent: Aug. 23, 2011

(54) DOMAIN ID SERVICE

(75) Inventors: Carl M. Ellison, Seattle, WA (US); Paul J. Leach, Seattle, WA (US); Butler W. Lampson, Cambridge, MA (US); Melissa W. Dunn, Woodinville, WA (US); Ravindra N. Pandya, Clyde Hill, WA (US); Charles W. Kaufman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1043 days.

(21) Appl. No.: 11/770,677

(22) Filed: Jun. 28, 2007

(65) Prior Publication Data

US 2009/0007247 A1  Jan. 1, 2009

(51) Int. Cl.
*G06F 7/04* (2006.01)
(52) U.S. Cl. .................................... 726/10; 726/5; 726/6
(58) Field of Classification Search .......... 713/168–171, 713/155, 156, 182, 185; 726/10, 5, 6; 380/279, 380/280, 282
See application file for complete search history.

(56) References Cited

U.S. PATENT DOCUMENTS

| | | | |
|---|---|---|---|
| 4,227,253 A | 10/1980 | Ehrsam et al. | |
| 5,202,921 A | 4/1993 | Herzberg et al. | |
| 5,555,309 A | 9/1996 | Kruys | |
| 5,768,519 A | 6/1998 | Swift et al. | |
| 5,812,666 A | 9/1998 | Baker et al. | |
| 6,879,690 B2 | 4/2005 | Faccin et al. | |
| 6,986,049 B2 | 1/2006 | Delany | |
| 7,016,495 B2 | 3/2006 | Scheidt et al. | |
| 7,096,354 B2 | 8/2006 | Wheeler et al. | |
| 7,533,258 B2 * | 5/2009 | Baugher | 713/156 |
| 2003/0115457 A1 * | 6/2003 | Wildish et al. | 713/157 |
| 2005/0075986 A1 * | 4/2005 | You et al. | 705/71 |

OTHER PUBLICATIONS

Tanaka, et al. "A Key Distribution and Rekeying Framework with Totally Ordered Multicast Protocols", Faculty of Information, Shizuoka University (2001), pp. 831-838.
Bragg. "Keys to the Domain", Redmond Channel Partner Online, http://rcpmag.com/columns/article.aspx?editorialsid=859, Jan. 1, 2005, 7 pages.
Nguyen. "Simplifying Peer-to Peer Device Authentication Using Identity-Based Cryptography," icns, p. 43, International Conference on Networking and Services (ICNS'06), 2006.

* cited by examiner

*Primary Examiner* — Edward Zee

(57) ABSTRACT

The subject disclosure pertains to a domain identification system, comprising a principal that has a key and a mnemonically meaningless identifier, the mnemonically meaningless identifier is used to identify the component in a networked environment. The mnemonically meaningless identifier can be bound to the public key by a binding. The component may be part of a neighborhood of components, and each member component knows the members' binding.

18 Claims, 12 Drawing Sheets

DOMAIN ID SERVICE

BACKGROUND

In today's computing world, security has come to the forefront of technological concerns due to the proliferation of viruses, trojan horses, worms, and other malicious software designed to harass and annoy. Virtually all businesses, banks, universities, hospitals and other organizations rely upon computing systems to store, access, and distribute sensitive information. Networks such as the Internet and smaller, local networks are prevalent and provide a greater degree of flexibility and capabilities than ever before attained. However, networking presents an attacker with a unique opportunity to intercept communications, or otherwise compromise security systems without alerting the computing system operator of the breach. A serious security breach could easily cause damage measured in billions of dollars. Given the high stakes involved, and the persistence of attackers, there is a need to strengthen computing security measures.

Each device on a network typically must be identified and trusted before transactions between the device and others on the network are secure. In an earlier day, efforts were made to centralize registration of device identities. Such efforts have largely failed and are undesirable. Having a single central identification service necessarily confers absolute identifying power in one place, which for several reasons, is undesirable. First, it is next to impossible to reach an agreement as to who will control the central service; second, the potential damage an attacker could cause if they could compromise the central service can be astronomical; and third, not all identifiers are of equal desirability, and assigning identifiers arbitrarily is prone to start "turf wars" over a particular persistent identifier. Also, certain agencies or entities may have security measures so strict that they are forbidden from joining the central service. These are just a few examples of why a central service has failed in the past, and is an unlikely direction for the security community to pursue in the future.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject disclosure concerns a domain identification system, where each component has a key and a mnemonically meaningless identifier. The identifier is mnemonically meaningless so that it is fungible—there is no reason to prefer one identifier to another. The mnemonically meaningless identifier is used to identify the component in a networked environment. The mnemonically meaningless identifier can be bound to the public key by a binding.

Principals not previously identified can be assigned new identifiers by generating a large random number and comparing it to existing identifiers. The numbers can be large enough so as to eliminate nearly all possibility of a collision, but in the case of a collision a new number can be generated. This process can continue until a unique identifier is found. The mnemonically meaningless quality of the identifier ensures that there is no reason for a principal to prefer one identifier to another, resulting in ease of assigning new identifiers.

The principal can be a member of any number of neighborhoods, where each member of a neighborhood can know each member component's binding. When there is an authentication request, the component receiving the request can query the members of the neighborhood whether they know a binding that would authenticate the source of the request. If so, the component can authenticate the source of the request, and trust can be established. If no member of the neighborhood knows a binding for the source of the request, the receiving component can instruct the members of the neighborhood to query members of their neighborhood whether any of them have a binding that will authenticate the source of the request. Requests can thus perpetuate across a mesh of neighborhoods until successful, or until some limit is reached. Requests can be limited to a certain number of neighborhoods, components, or an amount of time, etc.

If a binding is compromised, and the corruption spreads throughout the neighborhood so that each member has an incorrect binding for the compromised component, an authentication request by the compromised component to another component in another neighborhood will detect a discrepancy. An algorithm can be applied to require a certain level of influence (e.g., majority, plurality, ⅔rds, etc.) so as to restrict the propagation of the incorrect value, as well as the unauthorized access on the basis of the corrupt binding.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
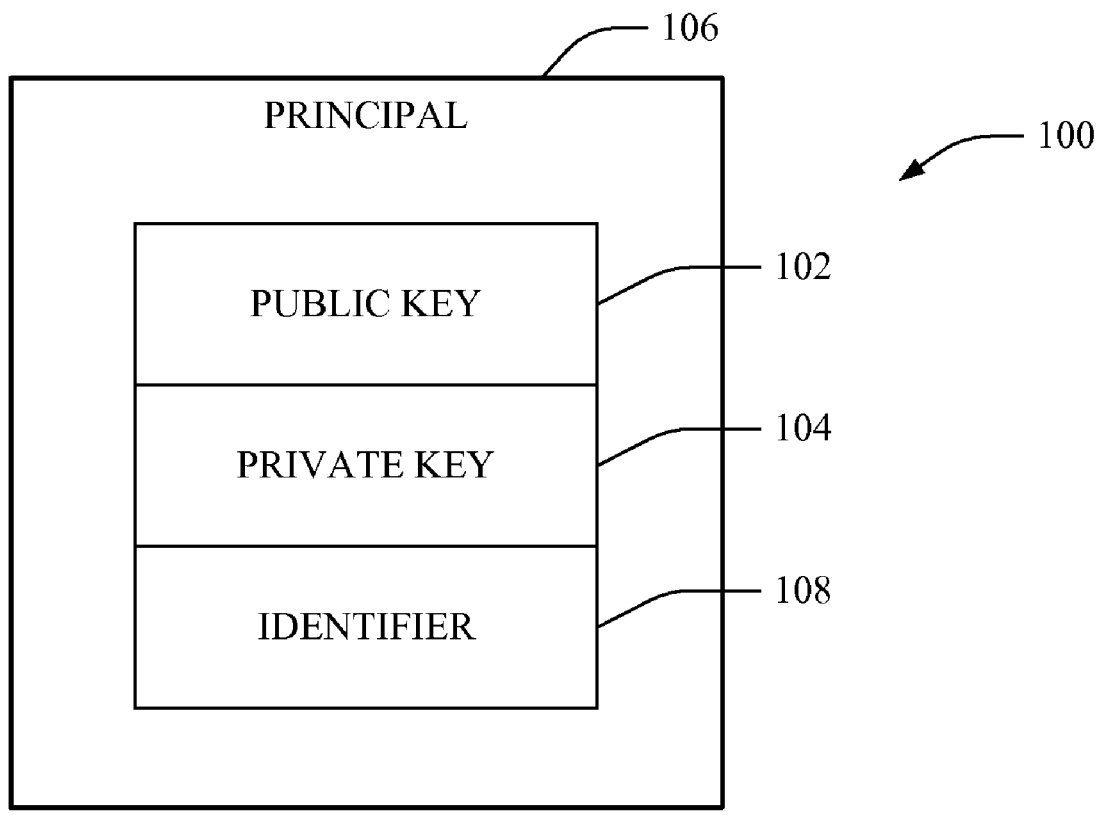
FIG. 1 is a block diagram of a system including a principal, having a public key, a private key, and an identifier.

Systems and methods relating to a domain identification service are provided, whereby devices, machines, computers, and other equipment capable of communicating electronically can establish trust with one another. Trust is the backbone of a secure computing environment, and it can be achieved through authentication. Once a device authenticates and establishes trust with another device, verified communications between the two devices can safely be considered secure. There are many methods of authentication, but for sake of brevity and illustration, aspects and embodiments of the subject disclosure will be described in terms of public key authentication routines. No generality is lost because there are well known methods of mapping from other authentication methods (e.g., biometrics, passwords, etc.) into access to a private key, so that an arbitrary authentication method can be represented as a public key operation. As such, the invention is not limited to public key routines, and one having ordinary skill in the art will appreciate that the invention can apply to virtually any authentication method available. As used throughout this disclosure, the term "principal" refers to an entity, a machine, a device, a computer, or any other component or group of components capable of communicating electronically. The domain identification services disclosed herein will allow for one computer system to make authoritative statements to another computer system about authentication in network messages that the other computer system can read and trust. In other words, one computer system can vouch for other trusted machines and devices.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used in this application, the terms "component," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Now turning to the figures, referring initially to FIG. 1, an illustration of a system 100 that can establish authentication is provided. Under traditional public key doctrine, there are two commonly included components, the public key 102 and the private key 104. The principal 106 who holds the keys keeps the private key 104 private, and therefore can use the private key 104 to prove ownership of the key. The public key 102 is used, in part, to send a transmission to another so that only the intended recipient can access the transmission. Public keys 102 are of course public, meaning anyone can access and use the public key 102, whereas only the holder of the key has access to the private key 104. To ensure good cryptographic hygiene, public keys 102 should be replaced occasionally. A public key 102 and a private key 104 pair should be declared invalid, and a new key pair generated due to a probability that an attacker has stolen the private key 104. Attackers do not normally announce their theft and many leave no trace whatsoever, so it is difficult to always know when there is a compromise. Therefore, the public key 102 and private key 104 pair must be proactively replaced on the off chance that the private key was stolen.

Many implementations of public key authentication use the public key 102 to identify the principal 106. However, coupling two duties in the public key 102 is undesirable because it scatters the public key 102 throughout the world in many hard to reach places such as access control lists, authorization certificates, and so forth. The public key 102 is in the data structures representing the principal 106, and if and when the principal changes the public key 102, suddenly the principal 106 no longer has access. At the time of a key change, the principal 106 would have to replace the public key 102 in all places in which it is located. Not only is this inefficient, some places may not be online, and so are virtually inaccessible, no matter how much effort is expended. For that reason, it is desirable to use one layer of indirection: a persistent identifier 108 that may last forever. In this manner the public key 102 is not required to both identify the principal 106 and ensure that only the holder of the private key 104 can access a transmission. This persistent identifier 108 can be simply a large, random number. It need not be a cryptographic key, and therefore can avoid running the risk of being compromised. There is no reason to replace the persistent identifier 108. The persistent identifier 108 can reside in all the places mentioned above and represent the principal 106 without being replaced periodically. There is a trade-off, however, between the permanence of the persistent identifier 108 and the functionality of the public key 102 used for identification purposes. The persistent identifier 108 is not suited to be used directly the way a public key 102 is used. However, creating a pairing or binding of the cryptographic public key 102 to the more persistent identifier 108 overcomes this difficulty. The subject disclosure facilitates managing the link between the public key 102 and the persistent identifier 108. If this link, or binding, can be maintained effectively, both the benefits of a persistent identifier 108 and of a cryptographic public key 102 can be obtained.

According to an aspect of the subject innovation, the persistent identifier 108 can be mnemonically meaningless. The persistent identifier 108 may be represented by an extremely large, non-cryptographic number generated at random; it may comprise simply a string of bits. The size of the persistent identifier 108 can vary, but generally is chosen large enough so as to minimize the likelihood of assigning the same number to more than one principal. Computing technology of today is such that numbers can be large enough so the possibility of common assignment is vanishingly small, and yet the number is not too cumbersome to store and transmit. If the persistent identifier 108 is mnemonically meaningless, there is no reason that any one principal should have a preference for a certain persistent identifier 108 over another. Some numbers (e.g., an athlete's jersey number) have meaning beyond their face value, and are desired above others. For an example of the difference between a persistent identifier 108 that has mnemonic meaning and one that does not, a vanity license plate has mnemonic value, while a randomly assigned license plate does not. Ridding the persistent identifier 108 of mnemonic meaning obviates a struggle between two principals 106 seeking the same specific persistent identifier 108. There can only be one license plate in each state that reads "SUE" and the first to request the plate will get it, but all others who want that plate will be disappointed and will not get the plate even though they may be named "Sue."

Figure 2:
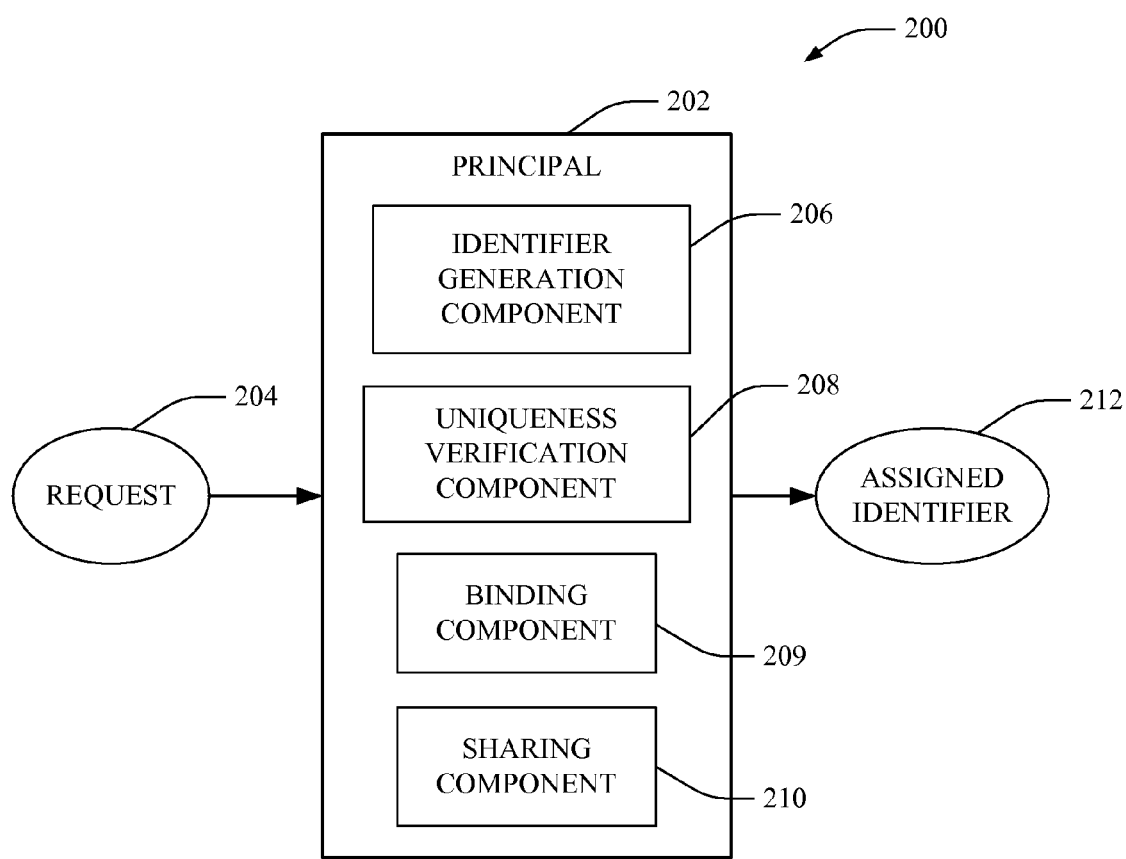
FIG. 2 is a block diagram of a system including a principal with an identifier generation component, a uniqueness verification component, and a sharing component.

Proceeding now to FIG. 2, an illustrative system 200 that can generate and assign persistent identifiers is shown. The principal 202 may require a persistent identifier to communicate and interact with other principals, as described above with respect to FIG. 1. The principal 202 may be one of a range of possible devices, each with different capabilities and equipment. For example, a state of the art super-computer has capabilities far and above those of a cell phone, and while both can benefit from having a persistent identifier bound to its public key, not all principals are equipped to generate them as described herein. The steps that follow, describing an embodiment of persistent identifier generation, can be performed by the principal 202 itself, or by another principal that supervises the assignment for another principal.

The principal 202 can receive a request 204 for a new persistent identifier from another principal (not shown). This request can also come from the principal 202 itself, depending on whether the principal 202 has sufficient capabilities to perform the necessary steps. Regardless of whether the principal 202 is acting for its own benefit, or on behalf of another principal, the process can be largely the same. An identifier generation component 206 can randomly generate a persistent identifier. As described above, this identifier can be mnemonically meaningless, having no value to the owner above its utility. There is nothing special or memorable about the number—it can be just a large string of bits. A binding component 209 can create a binding between a mnemonically meaningless persistent identifier and a key associated therewith. The binding can be used to verify that a given key speaks for a given domain. Due to the size and nature of the persistent identifier, the possibility of assigning the same number is vanishingly small, however, to verify that the newly generated identifier has not already been assigned, the uniqueness verification component 208 can compare the newly generated identifier against other known identifiers. In order to compare the new identifier with others, a uniqueness verification component 208 can employ the sharing component 210 to communicate with other principals. The sharing component 210 can enable querying the other principals whether the newly assigned identifier has been assigned to them, or any other principals they are familiar with. Once the uniqueness verification component 208 is satisfied that the new persistent identifier is sufficiently unique, the identifier generation component 206 can assign 212 the identifier to the requesting principal. If, however, the principal 202 discovers that the newly assigned persistent identifier has already been assigned, the principal 202 can simply communicate this fact to the identifier verification component 206 to generate a new persistent identifier, and the process can repeat. Having a mnemonically meaningless identifier allows this process to repeat until a satisfactory identifier is assigned, without desiring one identifier over another. This aspect can eliminate squabbles over certain identifiers between principals associated with previous identification methods.

In another aspect, the sharing component 210 can be used to share the principal's 202 persistent identifier with other principals, as well as to store the bindings of other principals' public keys and persistent identifiers in the same neighborhood. The bindings can be stored locally on each principal, or they can be stored on a central data store, or on a subset of the principals in the neighborhood. The sharing component 210 can coordinate distributing information among the principals in the neighborhood as needed. The information can be shared with other principals to allow them to compare newly generated persistent identifiers with the existing identifiers; however, because of the high likelihood that a newly generated persistent identifier is unique, the need for an exhaustive comparison with known persistent identifiers is mitigated.

Figure 3:
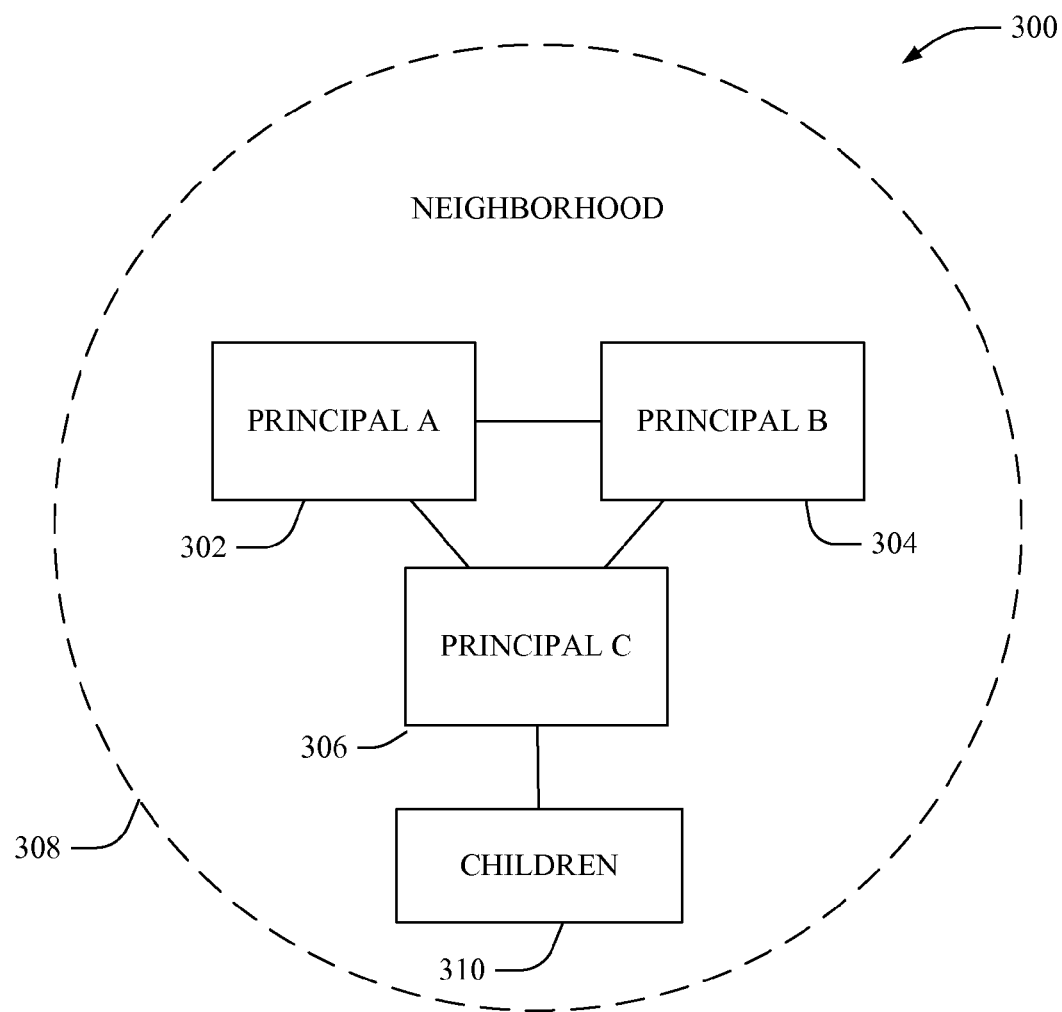
FIG. 3 is a block diagram of a system including a trusted neighborhood with stand alone entities and parent-child entities.

Turning now to FIG. 3, an illustrative description of a networking system 300 is shown. Principal A 302, principal B 304, and principal C 306 reside within a trusted neighborhood 308. There may be any number of principals within the neighborhood 308; the system 300 described herein is merely for illustration and does not limit the scope of the claimed subject matter. A principal can act as a parent for other principals, as shown by principal C 306 and its children 310. The parent principal C 306 may comprise a domain controller. A child's identity may be concatenated with the parent's identity to form the complete identity of the child. If the parent is trusted in the neighborhood 308, it can also be trusted to vouch for its children 310. It is to be appreciated that a parent may have no children, one child, or many children, as appropriate for a given situation.

If all entities were children of one parent, then all entities could register with the parent and establish trust with all other entities. The subject disclosure enables generalization of the single domain mechanism to worldwide applicability. Today's networking environment comprises multiple domains and networks, and therefore it is advantageous to allow multiple principals and entities to interact directly with one another across domains. One way of achieving this intercommunication is to have mirrored domain controllers that share the cryptographic information among themselves that collectively comprise a forest of domain controllers. A forest is a set of domain controllers with separate domain identities that trust each other, so when an entity signs up to one of them it signs up to them all. The trust may be complete or conditional. If complete, any one of the principals in the forest can speak for all the others. In another aspect, there is cross forest trust where among multiple forests, one forest trusts another, but only partially—only for domain identities in another forest's set of domains identities.

In another embodiment, the neighborhood 308 comprises a peer-to-peer (P2P) network, in which all principals decide to trust each other. In this embodiment, substantially the same machinery and protocols contemplated by a central service can be used, only deployed in a slightly different manner than in a central service. The subject disclosure allows deployment of the central service on each and every computer system in the neighborhood 308. Based on the level of trust each principal has with its peers in the neighborhood 308, each can learn the binding between the members' persistent identifier and public key. In this embodiment, when a new principal is initiated, a new persistent identifier can be generated as described above, and will be compared to all those belonging to some or all principals in the neighborhood 308 for a collision. Once successfully assigned, the new principal will share its persistent identifier with its neighbors, as well as the binding between the persistent identifier and the new public key.

Neighborhoods can hold member principals substantially as equals, or can assign a hierarchy according to a relevant characteristic of the member principals. Likely, not all principals in the neighborhood are of equal computing power, so a principal with more computing power may have available bandwidth and thereby receive higher status in the neighborhood. Factors such as the amount of time a principal has been a member, the number of successful authentications, and the like can be used to apportion privileges and responsibilities among the neighborhood. There may be partitions with respect to privileges among the neighborhood, or a continuous scale. Votes can be weighted according to the hierarchy of a neighborhood, if any. Ownership and/or control of a neighborhood can also be communal or proprietary. If controlled by a principal or group of principals, that principal can set the rules for the neighborhood at will. Some neighborhoods may function like a corporation, having a CEO, board members, and shareholders. There is virtually no limit to the organizational structure of the neighborhoods. Limits on the size of a neighborhood may be desired so that the neighborhoods do not become homogeneous, or overlap entirely with other neighborhoods.

Figure 4:
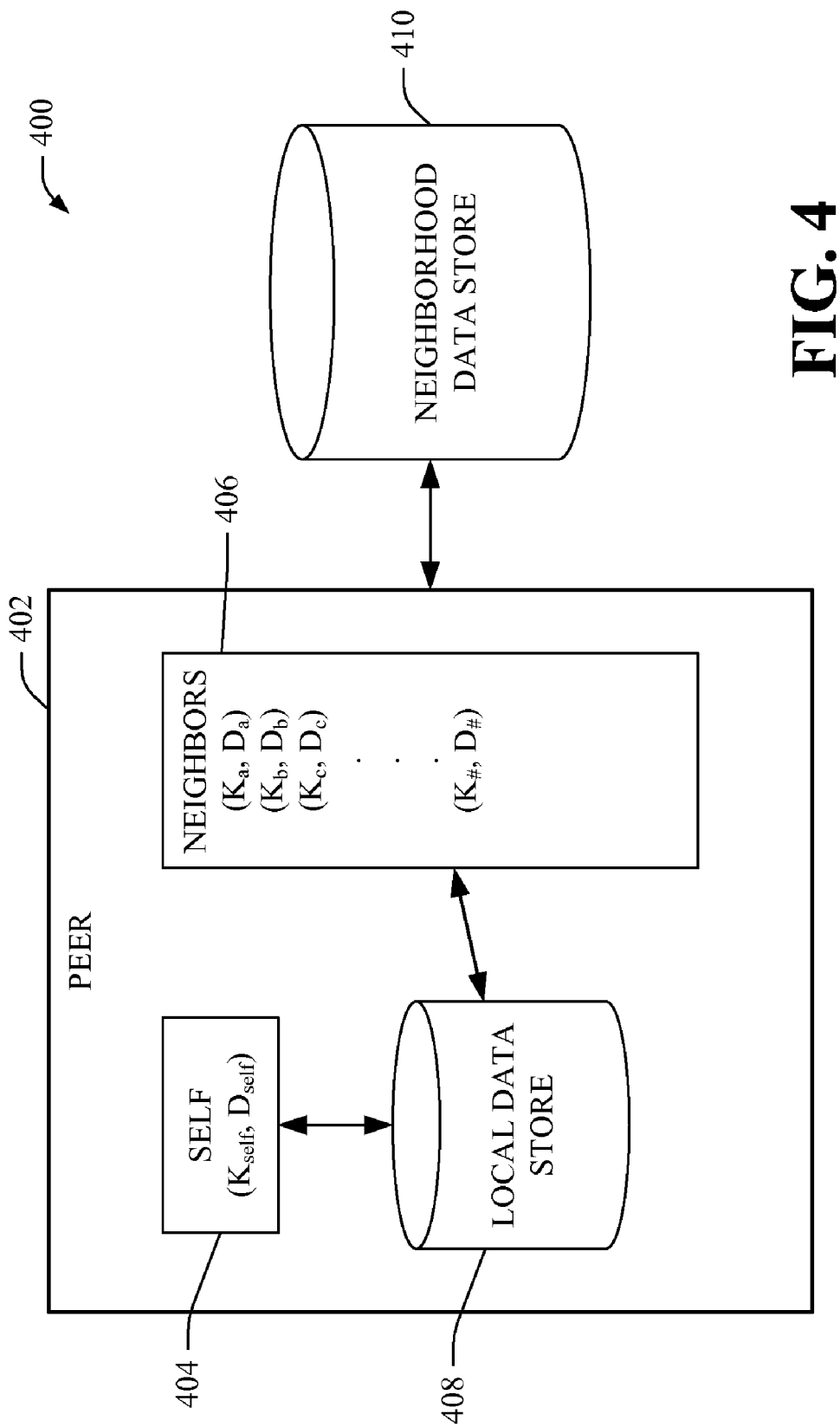
FIG. 4 is a block diagram of a system showing a principal member of a neighborhood that knows the bindings of other members of the neighborhood.

Moving on to FIG. 4, a descriptive representation of a system 400 illustrating neighborhood operation is shown. As used herein, the term "peer" is substantially synonymous with principal as defined above. Once again, there can be any number of peers in a given neighborhood, and this description is not meant to limit the scope of the claimed subject matter. Each peer 402 can have an assigned public key and a persistent identifier. This information may be used by a peer to identify itself to other principals and/or peers in this or other neighborhoods. While the public key may be replaced from time to time, the persistent identifier can live on without needing replacement. The binding 404 between public key "K" and the persistent identifier "D" can be represented as ($K_{self}$, $D_{self}$). This means that the public key belongs to the peer 402 described by the persistent identifier. Peer 402 also knows the bindings belonging to other peers in the neighborhood 406, and similarly, other peers know their own bindings, and the bindings of other peers in the neighborhood. Peer 402 is described for illustration only, and can be typical of other peers in the neighborhood.

Each peer in the neighborhood can maintain its own local data store 408, which can contain information such as the public key and persistent identifier, as well as the bindings pertaining to neighborhood members 406. Alternatively, the neighborhood can maintain a neighborhood data store 410, where this information is centralized. As described above, there are limitless organizational options for a neighborhood, and each neighborhood can maintain its own policy as to whether to maintain a neighborhood data store 410, and if so, which peer shall maintain it. The data stores 408 or 410 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store of the present systems and methods is intended to comprise, without being limited to, these and any other suitable types of memory.

Figure 5:
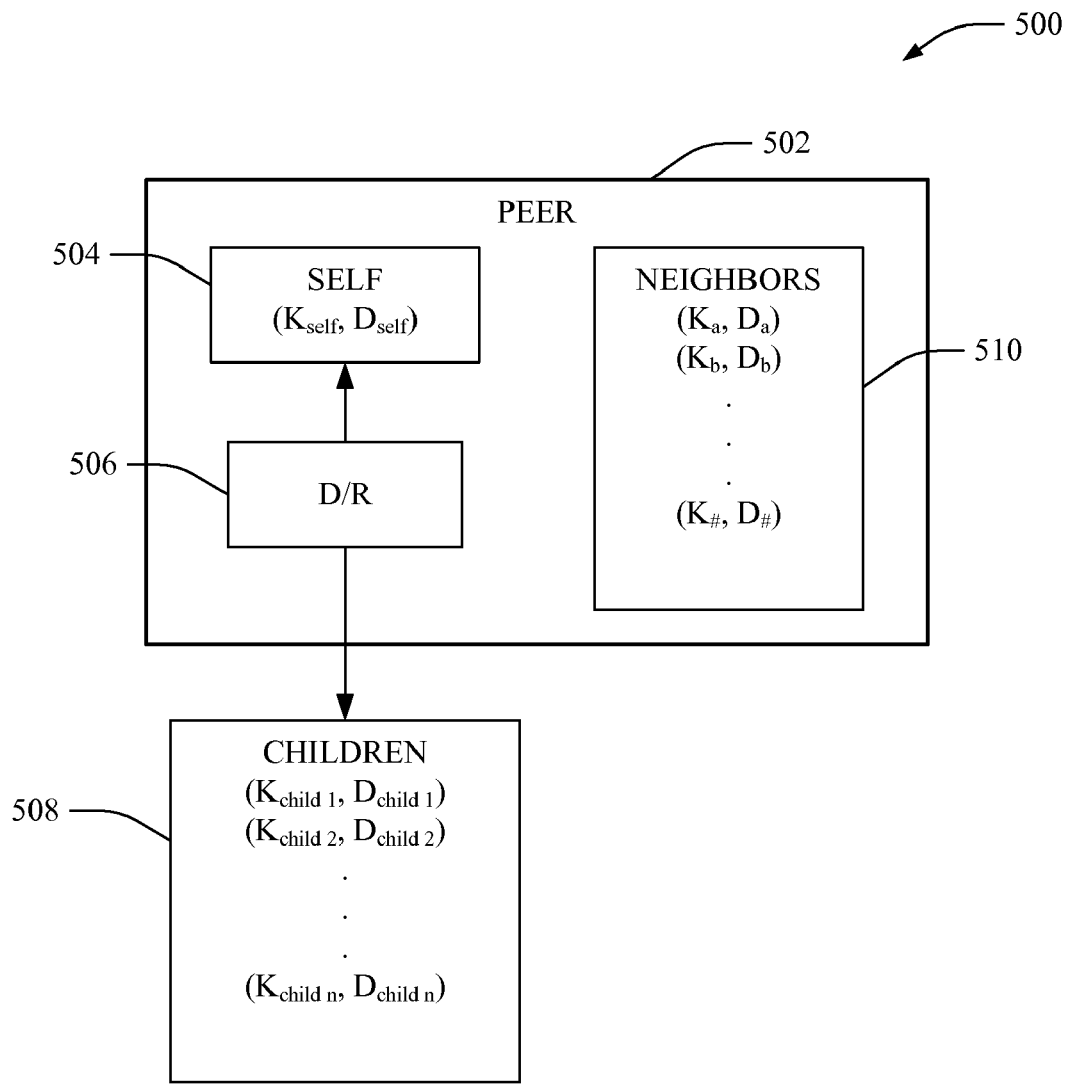
FIG. 5 is a block diagram of a system including a principal serving as a parent and sharing a relative identifier with its children.

FIG. 5 illustrates operation of a system 500 including a peer serving as a parent. Peer 502 has its own binding 504, and can apply a relative identifier 506 (commonly referred to as D/R) to each child 508 of peer 502. The persistent identifier of any child 508 may be a concatenation of the parent's persistent identifier (e.g., the persistent identifier of peer 502) and the relative identifier 506. The relative identifier 506 need not be globally unique, and the creator 502 of the relative identifier 506 need not consult with other peers. However, the relative identifier (D/R) 506 can be unique for the same reasons that the creator's 502 identifier 504 is unique. The parent, peer 502, can generate the relative identifier 506 in the manner described above with respect to FIGS. 1 and 2, and compare the newly generated persistent identifier against other neighbors' persistent identifiers and bindings 510 within a neighborhood. It is to be appreciated that peer 502 can have any number of children, and there can be any number of peers in any given neighborhood, and the description given herein is for illustrative purposes only and does not limit the subject disclosure in any way.

Figure 6:
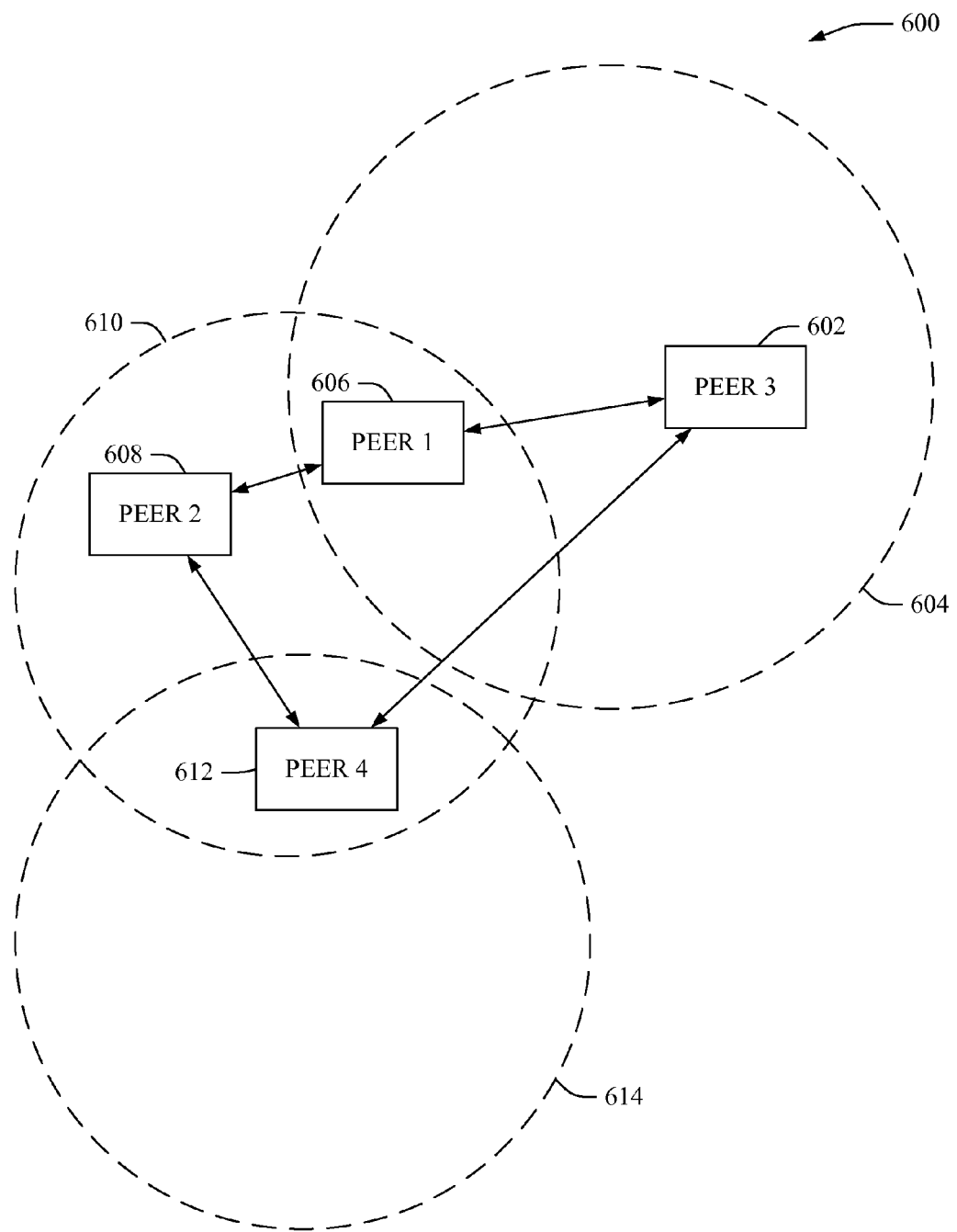
FIG. 6 is a block diagram of a system with a neighborhood mesh.

Now proceeding to FIG. 6, an illustrative embodiment showing a neighborhood mesh 600 is provided. Peer 3 602 belongs to neighborhood 604. Peer 3 602 can receive an authentication request from a principal such as peer 1 606 within the neighborhood 604. Since these two peers are within the same neighborhood 604 authentication can be easily carried out. The two principals are familiar with the bindings between each other's public key and persistent identifier, and can quickly establish trust, open a secure channel, and transact at will. Peer 3 602 can also receive a communication request from a principal outside of its neighborhood 604, such as peer 2 608. In order to verify the identity of peer 2 608, peer 3 602 can first ask peers in its immediate neighborhood 604 whether any of them have the binding pertaining to peer 2 608. Peer 1 606 and peer 2 608 are both in neighborhood 610, so peer 1 606 knows the binding for peer 2 608, and can thus relay back to peer 3 602 the binding and therefore peer 3 602 can authenticate peer 1 608, and commence a secure channel between them.

Peer 3 602 can also establish trust with peer 4 612 which does not reside in any common neighborhood with peer 3 602. Peer 4 612, however, does reside within neighborhood 614 along with peer 2 608, and thus a chain between peer 3 602 and peer 4 612 can be made. The peers can request their neighbors whether they know a binding, and if the answer is negative, the peers can request that their neighbors request of their neighbors in other neighborhoods know the binding, and so on until the chain is established. A request for verification may be sent out and not returned in the affirmative, which can be interpreted as meaning there is no known neighbor who has the binding that pertains to the principal who initiated the authentication request, and the request can be denied. The request can time out, meaning that if a set amount of time passes before an affirmative answer comes back, the answer is negative. The amount of time generally will depend on network characteristics and other variables. Alternatively, the request may have a finite lifetime, meaning that it will only reach a set number of neighborhoods before the request is abandoned. Similarly, a finite number of principals within each neighborhood can be set. For example, the request can have a limit of 100 principals, and if the first neighborhood contains 25 principals, and the second contains 80 principals and none can answer the request in the affirmative, the request can go abandoned. Whether the limits on a request are set initially, a neighborhood somewhere down the chain may maintain a policy of attaching limits to certain requests to restrain unruly requests. These limits act to ensure that a request does not simply bounce around the world forever. In another aspect, each principal can maintain a trail for each request, so that if and when an affirmative answer comes back the principal knows where to relay the answer so that it reaches its destination. Also, a neighborhood can send an answer in the negative if the request has reached the end of its run, or even if the request is still underway. It is to be appreciated that FIG. 6 is a simplified view of a neighborhood mesh 600, and that neighborhoods can be multi-dimensional and can overlap one another.

The mesh 600 can also be used when newly initiated principals seek a new persistent identifier. The principal creating the persistent identifier can compare a newly generated persistent identifier against others in its neighborhood, and even request that principals in the neighborhood compare the persistent identifier against others in their neighborhood, and so on throughout the mesh 600 until the principal is satisfied that the new persistent identifier is unique.

Figure 7:
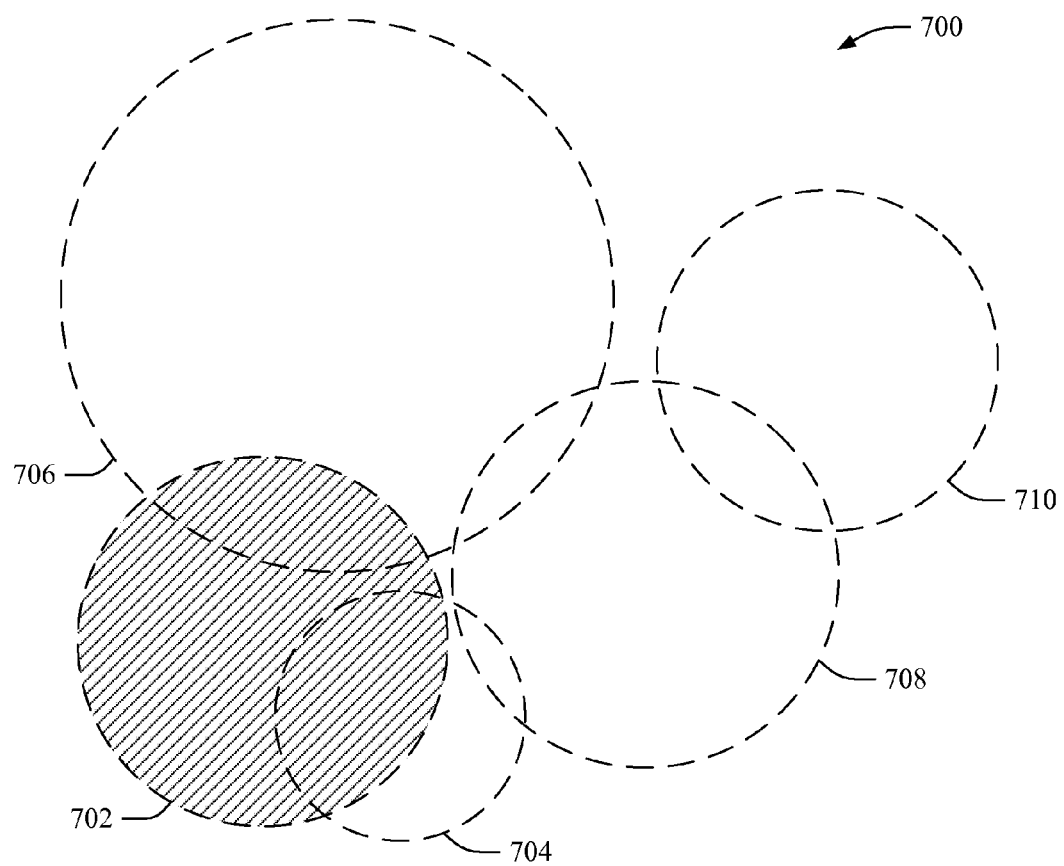
FIG. 7 is a block diagram of a system including a neighborhood mesh where one neighborhood is corrupted.

Arriving now at FIG. 7, a neighborhood mesh 700 is shown, where one of the neighborhoods has been corrupted (e.g., neighborhood 702). The cause and source of the corruption can be anything from a virus or other malicious software, to a more benign source such as a simple calculation error or machine failure. For purposes of illustration, assume that the attack compromises a single principal's binding, and the change is reported to all other members of the neighborhood. The attacker then can impersonate the corrupted principal, allowing the attacker to convince those in the corrupted neighborhood 702 that the attacker is the principal. However, when the attacker attempts to authenticate to a principal outside the corrupted neighborhood 702, but within a partially corrupted neighborhood 704 or 706, there may not be a consensus in the partially corrupted neighborhood 704 or 706 as to the correct binding for the corrupted principal. The illustrative system can employ an appropriate algorithm to resolve disputes within a partially corrupted neighborhood 704 or 706. A simple majority, more, or less can be required. As the size and overlap of the partially corrupt neighborhood varies, so will the influence of one corrupt principal. As shown, partially corrupted neighborhood 704 is more corrupt than partially corrupted neighborhood 706. Even if the corruption can overtake another neighborhood such as neighborhood 706 by achieving the required threshold, it is unlikely that the corruption will continue to spread. As illustrated, neighborhood 706 does not occupy more than a small part of the next neighborhood 708. In this way, each neighborhood can operate like a democratic legislative body, where each principal has a vote. In the event of a change of a binding, each principal can be required to muster the required amount of votes, and unless that threshold is met, the vote may fail and the corruption can be reversed for the principals that reside in both neighborhoods. Moreover, a binding can be established out-of-band (e.g., a human path, or hand-carried binding) and take precedence over any neighborhood-learned binding. Also, neighborhoods can implement policies that limit the amount of overlap between neighborhoods. In this way, all attempts to authenticate are subject to scrutiny in both the corrupted neighborhood and another neighborhood.

If, on the other hand, the attacker attempts to authenticate with another principal located in an unaffected neighborhood 710, because the two neighborhoods do not share any member principals, the unaffected neighborhood 710 will initiate a request to surrounding neighborhoods in an attempt to authenticate. The request may perpetuate along the mesh 700 until it reaches a partially corrupted principal 704 or 706 and from there the corruption can be handled as described above. The illustrated neighborhoods in FIG. 7 are a simplification, and in actuality there may be hundreds or thousands of neighborhoods that intersect with the corrupt neighborhood 702. With enough partially corrupted neighborhoods surrounding a completely corrupted neighborhood, the corrupted principal within the completely corrupted neighborhood can be more easily identified and remedied.

Figure 8:
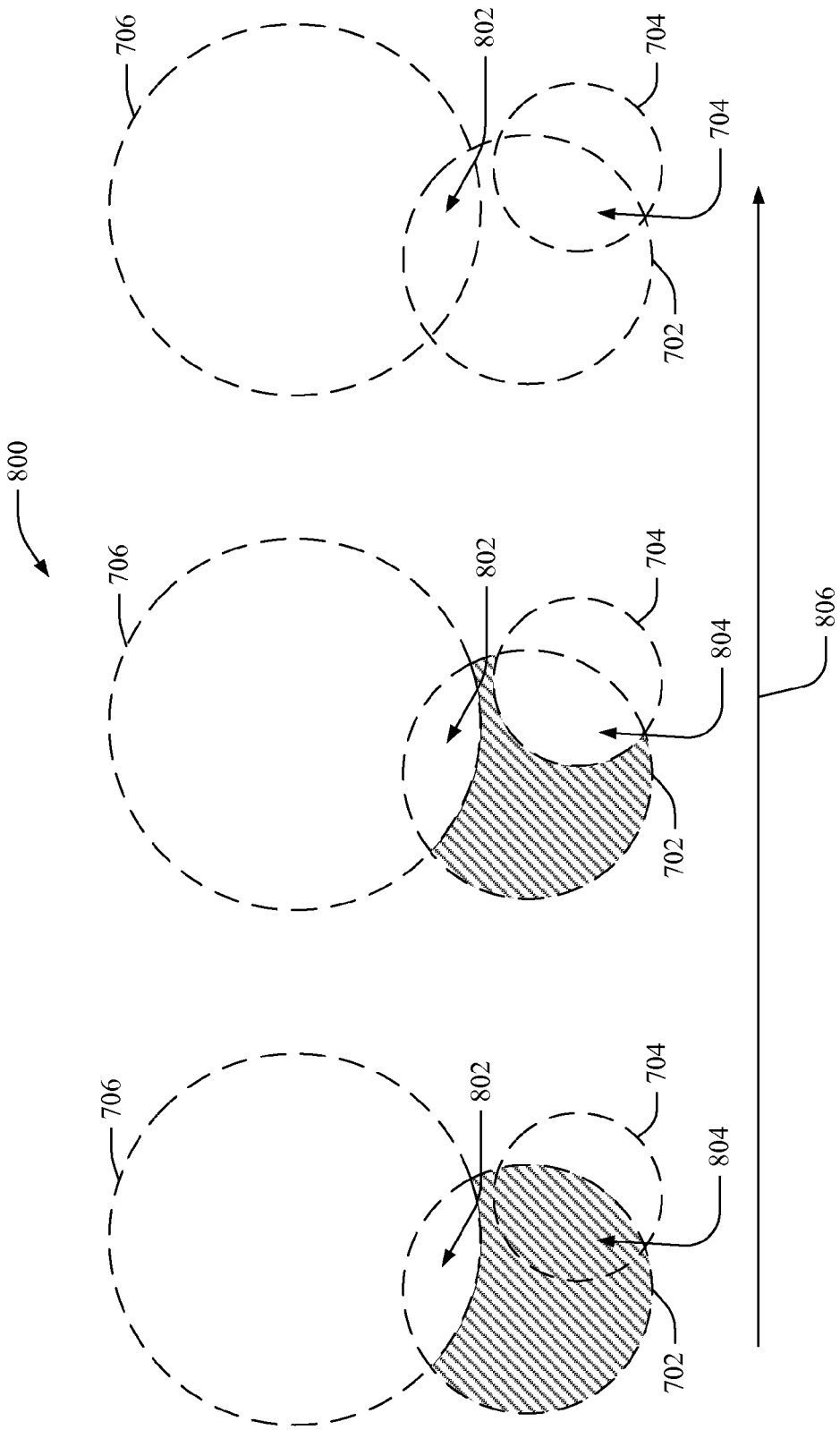
FIG. 8 is a block diagram of a system including a neighborhood mesh where corruption is cleansed from a neighborhood.

Proceeding on to FIG. 8, a process 800 for correcting a corrupted neighborhood is shown. Continuing the example from above, the partially corrupt neighborhood 706 can have resolved any discrepancy within the neighborhood, and restored the binding to its uncorrupted state, as represented in FIG. 8 by the intersecting portion 802 of neighborhoods 702 and 706. Partially corrupt neighborhood 704 can perform the same remedy on the intersecting portion 804 of neighborhoods 704 and 702. This process can continue as described by the arrow 806 until neighborhood 702 is cleansed. Otherwise, the neighborhood can take action to recognize the cleansing trend and proactively spread it throughout the entire neighborhood. It is possible for manual intervention to be employed if and when there is a compromised binding.

A binding between a key and a persistent identifier may from time to time be replaced legitimately. An appropriate algorithm, such as a high entropy secret, can be employed to allow replacement without being overridden by the bindings stored in adjacent neighborhoods. Public keys can have a certain expiration date not generally known, but known to other principals, and during a set window new values will be allowed to propagate across the neighborhood mesh. Another alternative is to generate a new persistent identifier, and create a new binding.

In another embodiment, after a successful assignment of a persistent identifier, the system can provisionally record a mapping between key and identifier, and return to the new owner of the persistent identifier a symmetric key of very high entropy (e.g., 256 bits) to be used to authenticate if and when the key bound to that identifier is compromised. This symmetric or revocation key can be saved away by the persistent identifier's owner in a secure manner. Because the revocation key is not used except in the extremely rare event of needing to revoke a compromised key, we assume that it cannot be compromised. That is, it would exist on the identifier-owner's machine for only an extremely short period of time—from the time it is received until it is prepared for secure backup. The identifier's owner who needs to revoke a key can then contact a neighborhood or peer with which that key is registered and authenticates using the revocation key originally provided by that neighborhood or principal—presenting a new public key to bind to the identifier in question.

In a related aspect, artificial intelligence (AI) components can be employed to facilitate assignment of persistent identifiers. Some neighborhoods may have a higher level of trust than others, some may have too many members to be trusted completely. These factors can be used to infer a preference of one neighborhood over another, such that preferred neighborhoods can be contacted before less desired neighborhoods, for example. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Figure 9:
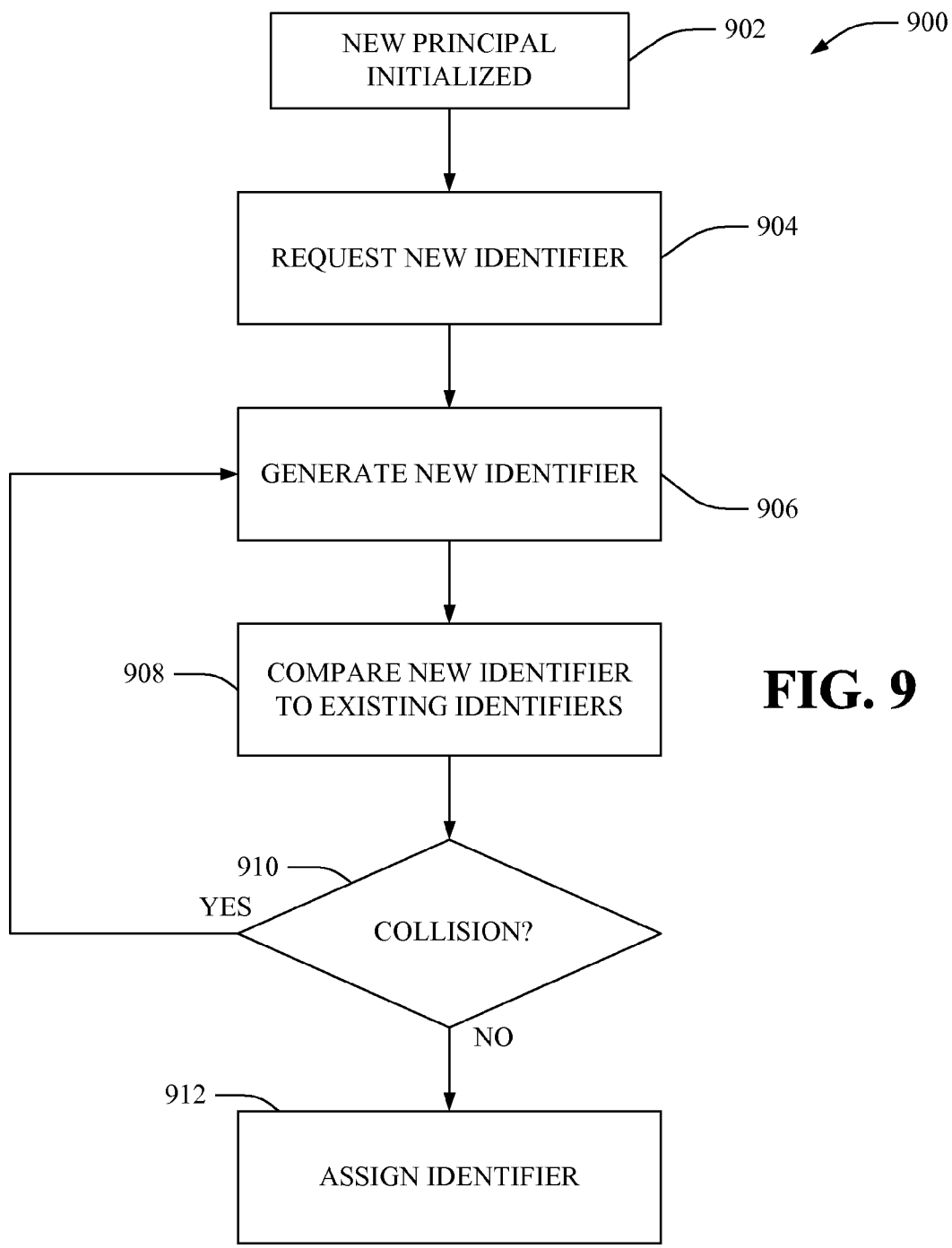
FIG. 9 is a flow chart diagram of a methodology for creating and assigning a new identifier.
Figure 10:
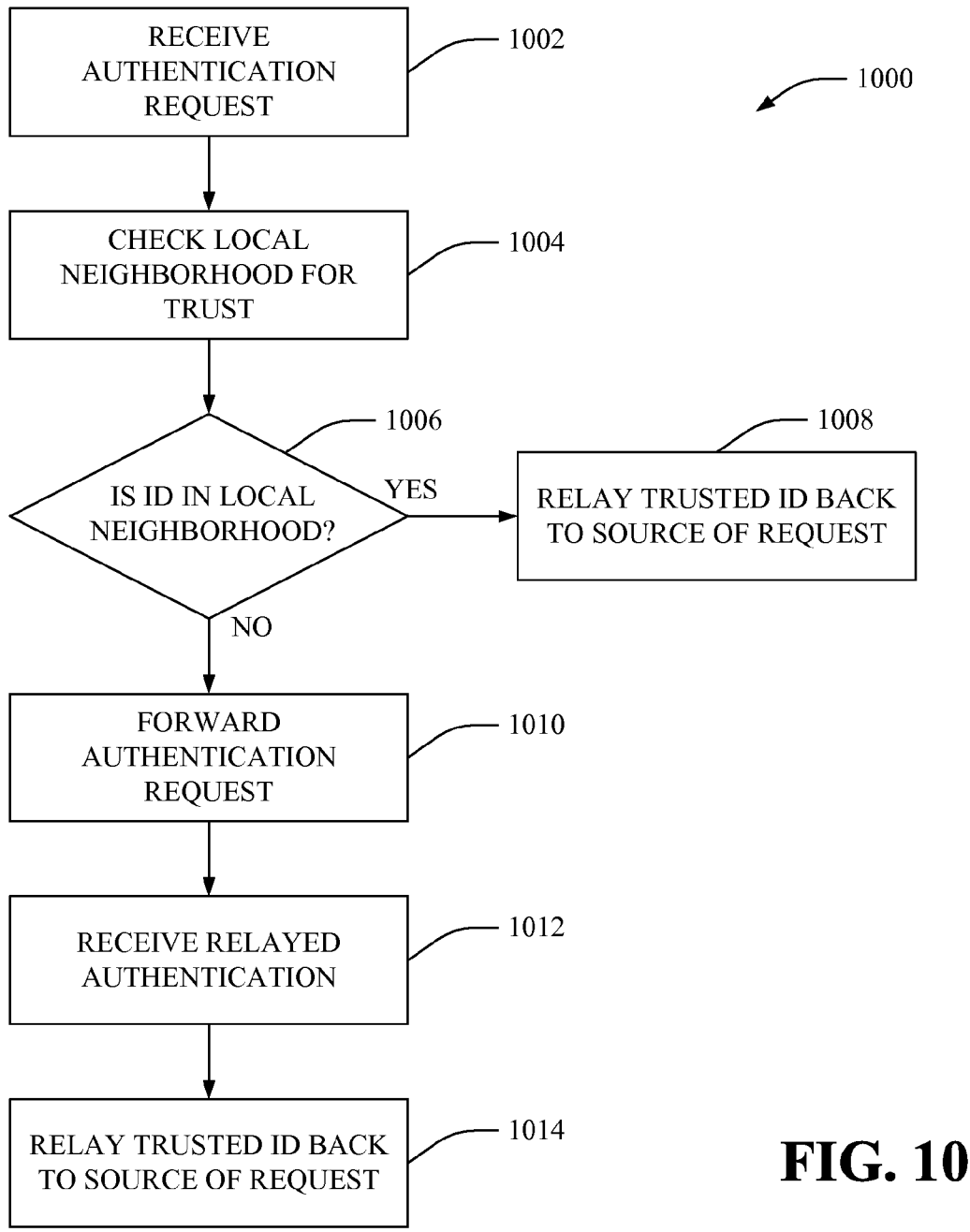
FIG. 10 is a flow chart diagram of a methodology for receiving and relaying authentication requests among a neighborhood mesh.

In view of the illustrative systems described supra, methodologies that may be implemented in accordance with the disclosed subject matter will be better appreciated with reference to the flow charts of FIGS. 9 and 10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 9 illustrates a methodology 900 for introducing a new principal and establishing a new persistent identifier. At reference numeral 902, a new principal is initialized, and may require an identity. The principal can be a newly powered up machine, or it can be a device that may have existed previously and is re-establishing a connection with other principals. At reference numeral 904, the principal requests a new persistent identifier. The subject disclosure encompasses virtually all types of machines, which may have greatly differing capabilities. Not all machines that have a need for a persistent identifier will be properly equipped to perform the steps to obtain such identifier—another, more powerful principal may supervise obtaining a persistent identifier for a lesser capable principal, and perform any of these steps so that all principals can be identified reliably. Accordingly, the request for a new persistent identifier is made, either by the principal who needs the identifier, or another, supervising principal. At reference numeral 906, a new persistent identifier is generated. Before assigning the new persistent identifier, it can be compared against known existing identifiers at numeral 908. Given the mnemonically meaningless character of the persistent identifier, there is almost no chance that a new identifier is in use, so the comparison can be restricted in scope, or omitted. If there is a collision, at reference numeral 910, the method 900 can repeat by generating a second persistent identifier, at reference numeral 906. In accordance with an aspect, the identifier can be mnemonically meaningless, which ensures that selecting a new identifier has no drawback. There is no reason to prefer one identifier to another. Eventually, an identifier can be found that is not in use, and can then be assigned to the principal at reference numeral 912.

FIG. 10 illustrates a methodology 1000 of verifying that a given key speaks for a given domain, in association with a neighborhood mesh. At reference numeral 1002, a principal receives an authentication request. The request generally can come from any principal seeking to establish trust and open a secure line of communication. Both the principal seeking to authenticate and the principal receiving the request can either be stand-alone machines, or can be a parent entity such as a domain controller or the like. In an effort to authenticate the request, the receiving principal can first check its own local neighborhood 1004. Principals may belong to multiple neighborhoods, and therefore the principal can perform this same series of actions in other neighborhoods of which it is a member. For simplicity of illustration, the discussion will be limited to the perspective of the principal receiving the initial request, in only one neighborhood. At reference numeral 1006, if the principal resides within the local neighborhood, the principal can verify the binding between the persistent identifier and the public key, and thus can assure that the principal requesting authentication is in fact the principal it purports to be, and at reference numeral 1008 the binding between key and domain is verified and the authentication can be completed. On the other hand, if the requesting principal is not a member of the local neighborhood, the request is forwarded to other principals in the neighborhood at 1010. The request will thus perpetuate throughout the neighborhood mesh, with each principal responding that they either do or do not know the binding pertaining to the requesting principal. At reference numeral 1012, the principal receiving the request can maintain enough information about the request so that if and when a request returns from somewhere in the mesh, the principal can authenticate the principal initiating the request at 1014.

Substantially the same methodology 1000 can be applied if viewed from the perspective of a neighborhood somewhere along a chain, rather than at the incipience of the authentication request. The principal receives a request from another principal at 1002, then checks the local neighborhood to see whether it knows the binding at 1004. If so, the binding can be relayed back to the source of the request 1008, and if not, the request can be forwarded onward to other principals in the neighborhood 1010. The neighborhood can then wait to receive a relayed binding 1012 and relay the binding back toward the source of the request 1014.

Figure 11:
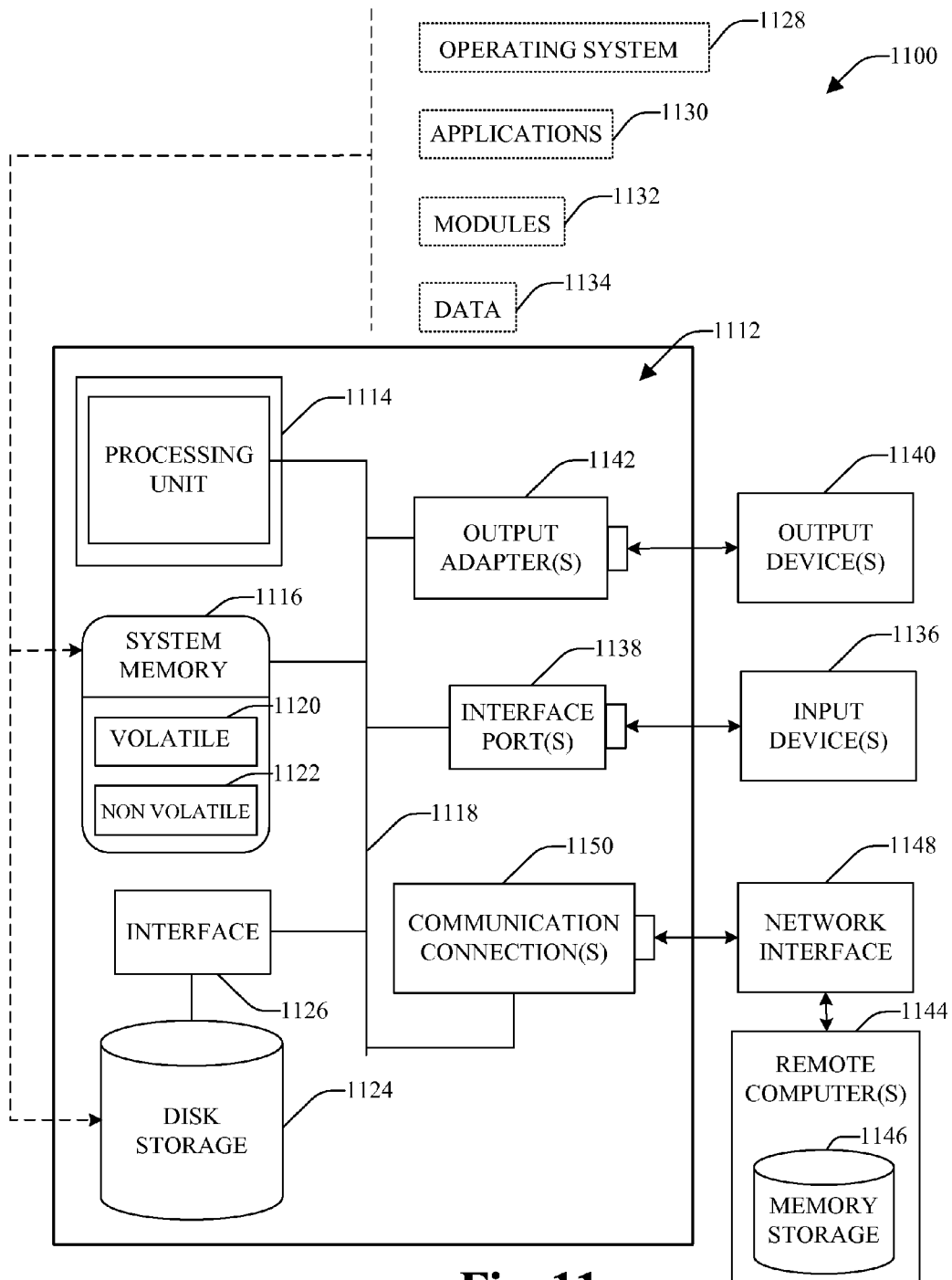
FIG. 11 is a schematic block diagram illustrating a suitable operating environment.
Figure 12:
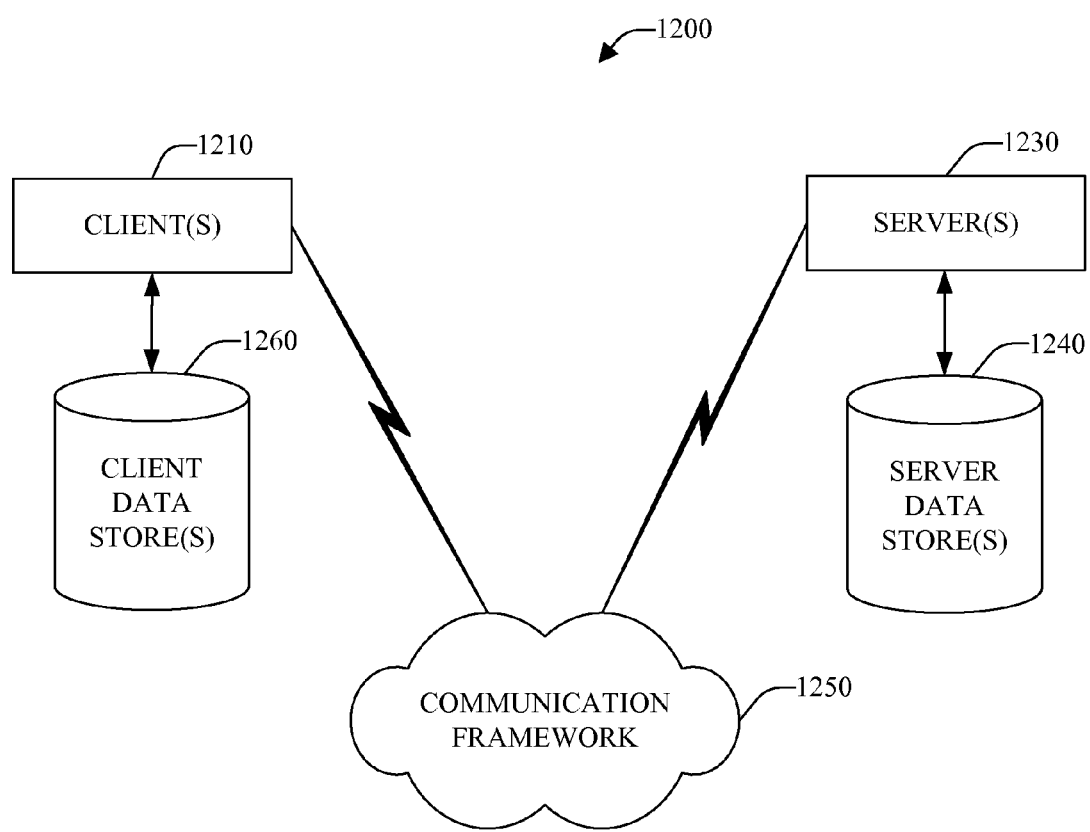
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary environment 1100 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 couples system components including, but not limited to, the system memory 1116 to the processing unit 1114. The processing unit 1114 can be any of various available microprocessors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/nonvolatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards or components.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the present invention, for example. One possible communication between a client 1210 and a server 1230 may be in the form of a data packet adapted to be transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations thereof are used in either the detailed description or the claims, such terms are intended to be inclusive in a manner similar to the term "comprising" as "comprising" is interpreted when employed as a transitional word in a claim.

What is claimed is:

1. A domain identification system comprising at least one processor, the system comprising:
a principal from a plurality of principals;
an identifier generation component that generates, with the at least one processor, a mnemonically meaningless persistent identifier and assigns the mnemonically meaningless persistent identifier to the principal, wherein the principal is a member of a neighborhood comprising the plurality of principals;
a binding component that binds the mnemonically meaningless persistent identifier to a public key by a binding, the public key is used to authenticate the principal in a networked environment; and
a sharing component that shares the mnemonically meaningless persistent identifier and the binding with at least one another principal from the plurality of principals, wherein:
the principal is configured to receive an authentication request and query the plurality of principals in the neighborhood to determine whether at least one principal from the plurality of principals is familiar with a binding that can authenticate a source of the authentication request, and
the principal is further configured to, when the principal is a member of at least one other neighborhood and when it is determined that none of the plurality of principals in the neighborhood is familiar with the binding that can authenticate the source of the authentication request, forward the authentication request to at least one other principal in the at least one other neighborhood.

2. The system of claim 1, further comprising a uniqueness verification component that verifies the uniqueness of the mnemonically meaningless persistent identifier.

3. The system of claim 1, wherein the principal is a domain controller and wherein the system assigns a relative identifier to a device authenticated to a domain controlled by the domain controller.

4. The system of claim 2, wherein at least one of the identifier generation component or the uniqueness verification component resides on the principal that has been assigned the mnemonically meaningless persistent identifier.

5. The system of claim 2, wherein at least one of the identifier generation component or the uniqueness verification component resides on at least one principal other than the principal that has been assigned the mnemonically meaningless persistent identifier.

6. The system of claim 1, wherein the principal comprises a private key.

7. The system of claim 1, wherein each of the plurality of principals in the neighborhood has a key and a mnemonically meaningless persistent identifier that is bound to the key by a binding, and wherein the principal is familiar with the mnemonically meaningless persistent identifier and the binding of each of the plurality of principals.

8. The system of claim 7, wherein members of the neighborhood store the bindings of other members of the neighborhood in a library.

9. The system of claim 8, wherein the principal instructs the at least one principal from the plurality of principals in the neighborhood to search a library of the at least one principal for a binding that can verify the authentication request.

10. A method for utilizing an identifier for a principal from a plurality of principals that is a member of a neighborhood comprising the plurality of principals, the method comprising:
with at least one processor:
generating a mnemonically meaningless persistent identifier for the principal;
binding the mnemonically meaningless persistent identifier to a key by a binding;
verifying that the mnemonically meaningless persistent identifier is different from each of a plurality of mnemonically meaningless persistent identifiers assigned to the plurality of principals in the neighborhood;

when it is verified that the mnemonically meaningless persistent identifier is different from each of the plurality of mnemonically meaningless persistent identifiers, assigning the mnemonically meaningless persistent identifier and the binding to the principal;

receiving an authentication request and, when the principal is not familiar with a binding that can authenticate a source of the authentication request, querying the plurality of principals in the neighborhood to determine whether at least one principal from the plurality of principals is familiar with the binding that can authenticate the source of the authentication request; and when the principal is a member of at least one other neighborhood and when it is determined that none of the plurality of principals in the neighborhood is familiar with the binding that can authenticate the source of the authentication request, forwarding the authentication request to at least one other principal in the at least one other neighborhood.

11. The method of claim 10, performed by the principal that has been assigned the mnemonically meaningless identifier.

12. The method of claim 10, performed by a supervising principal on behalf of another principal.

13. The method of claim 10, further comprising generating a second mnemonically meaningless identifier if the mnemonically meaningless identifier has already been assigned.

14. The method of claim 10, further comprising sharing the mnemonically meaningless persistent identifier and the binding assigned to the principal with the plurality of principals.

15. The method of claim 14, further comprising receiving the request for authentication from the source comprising a second principal.

16. The method of claim 15, wherein the second principal is a member of the neighborhood.

17. The method of claim 10, wherein, when it is determined that none of the plurality of principals is familiar with the binding between the key and the identifier of the source of the authentication request, forwarding the authentication request to the at least one other principal in the at least one other neighborhood comprises requesting that the at least one another principal in the at least one other neighborhood verify the source of authentication the request.

18. A computer system for domain identification comprising at least one processor, the computer system comprising:

means for generating, with the at least one processor, a mnemonically meaningless persistent identifier;

means for verifying, with the at least one processor, that the mnemonically meaningless persistent identifier is different from each of a plurality of mnemonically meaningless persistent identifiers assigned to a plurality of principals in a neighborhood;

means for assigning the generated mnemonically meaningless persistent identifier to a principal from the plurality of principals when it is verified that the mnemonically meaningless persistent identifier is different from each of the plurality of mnemonically meaningless persistent identifiers;

means for binding the generated mnemonically meaningless persistent identifier to a key held by the principal;

means for receiving an authentication request and querying the plurality of principals in the neighborhood to determine whether at least one principal from the plurality of principals is familiar with a binding between a key and an identifier of a source of the authentication request; and means for, when the principal is a member of at least one other neighborhood and when it is determined that none of the plurality of principals in the neighborhood is familiar with the binding between the key and the identifier of the source of the authentication request, forwarding the authentication request to at least one other principal in the at least one other neighborhood.

* * * * *